Figure 2:
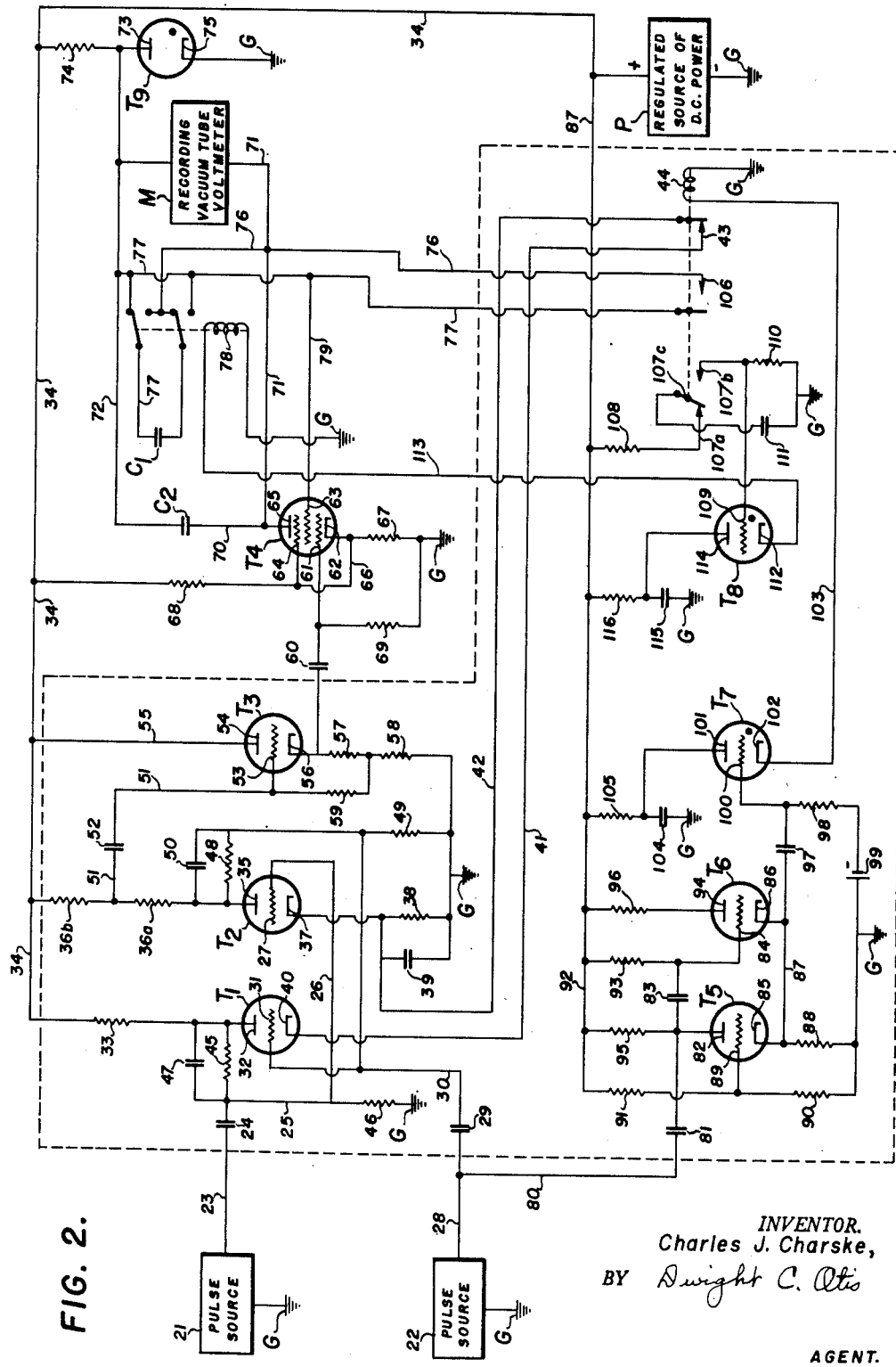

April 28, 1953
C. J. CHARSKE
2,637,010
METHOD AND APPARATUS FOR NEUTRALIZING
POLARIZATION HYSTERESIS IN CAPACITORS
Filed Feb. 15, 1951
2 SHEETS—SHEET 1
FIG. 1.
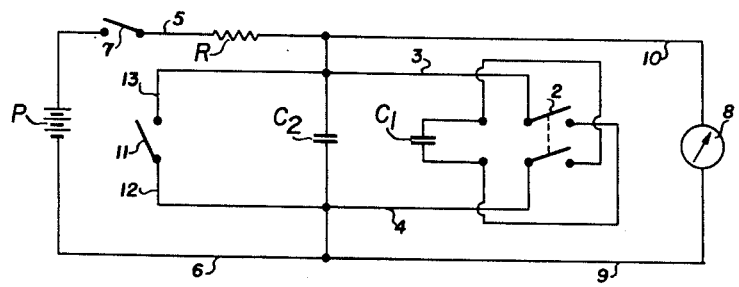
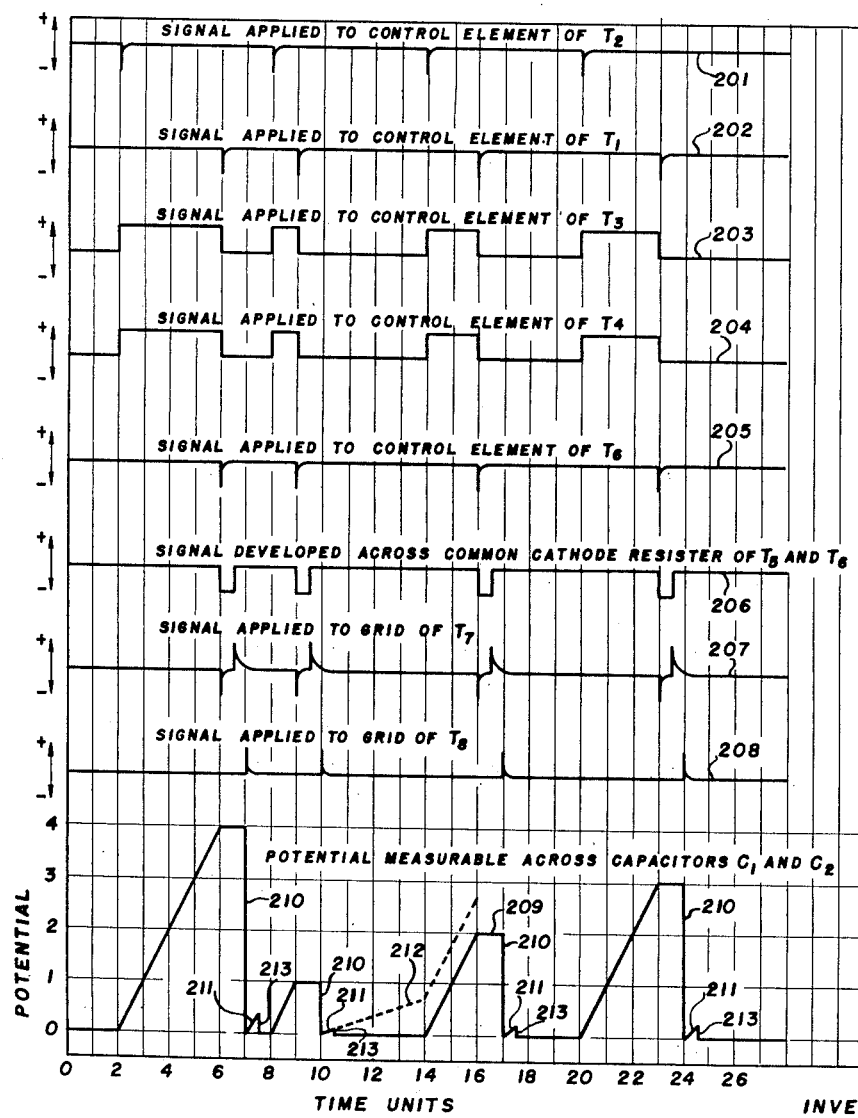
FIG. 3.
INVENTOR.
Charles J. Charske,
BY Dwight C. Otis
AGENT.

INVENTOR.
Charles J. Charske,
BY Dwight C. Otis
AGENT.

Patented Apr. 28, 1953

2,637,010

UNITED STATES PATENT OFFICE 2,637,010

METHOD AND APPARATUS FOR NEUTRALIZING POLARIZATION HYSTERESIS IN CAPACITORS

Charles J. Charske, Houston, Tex., assignor, by mesne assignments, to Standard Oil Development Company, Elizabeth, N. J., a corporation of Delaware Application February 15, 1951, Serial No. 211,164

6 Claims. (Cl. 320—1)

The present invention relates to electrical networks employing capacitors having polarizable dielectric substances between the plates thereof. More particularly, the present invention relates to a method and apparatus for minimizing adverse effects attributable to polarization of dielectric materials employed in electrostatic storage devices which are subjected to repeated charging and discharging over small increments of time. In one specific form, the invention relates to improvements in electrical timing networks wherein the magnitude of the charge stored in an electrostatic storage device is utilized as a measure of time during which unidirectional electric energy is caused to flow in series from a source of constant potential, or constant current, through an electrical resistance and into said storage device.

Briefly stated, my invention contemplates initiating flow of unidirectional electric energy into two parallel-connected capacitors, whereby a polarized electrostatic field is developed and dielectric material contained therein is subjected to polarization by said field, terminating the flow of energy at the end of a desired interval of time, utilizing the potential of the electrostatic field built up in the capacitors, and subsequently reversing the polarity of one capacitor with respect to polarity of the other capacitor.

It is well known in the electrical arts that, when an uncharged electrical capacitor is connected directly across the terminals of a unidirectional source of potential, an electrostatic field is rapidly built up between conductive plates within the capacitor and the potential measurable between terminals of the capacitor approaches the potential of the source. It is also well known that, if an electrical resistance is connected in series with the capacitor and if the resulting series circuit is connected across the terminals of said source, the magnitude of the potential measurable across the terminals of the capacitor approaches the potential of the source at an exponential rate according to the equation:

$$e_c = E(1 - \epsilon^{-t/RC})$$

wherein $e_c$ is the voltage to which the potential of the uncharged capacitor rises in $t$ seconds, E is the voltage of the source of potential from which the capacitor is charged, $\epsilon = 2.71828$ (the base of natural logarithms), C is the capacitance of the capacitor in microfarads, and R is the resistance of the resistor in megohms. When the foregoing equation is reduced to the form:

$$t = RC[\ln E - \ln(E - e_c)]$$

it may be readily shown that, if R, C, and E have constant finite values, $e_c$ must be zero when $t$ is zero and $e_c$ is greater than zero when $t$ is greater than zero. In other words, when R, C, and E are constant, $t$ is proportional to a function of $e_c$ and vice versa.

Many electrical systems utilizing the magnitude of the electrostatic potential built up across a fixed value of capacitance which is connected in series with a fixed value of resistance and a source of constant potential have been shown in the prior art as means for providing an indication of the magnitude of a period of time. While these systems have been satisfactory for some purposes, I have found that the results obtainable therefrom are not accurate under certain conditions. Particularly, this is true under conditions wherein the timing capacitor may be exposed to variable temperatures elevated above a normal calibration temperature. I have observed that, when capacitors containing solid dielectric or solid dielectric impregnated with liquid dielectric are charged and are then momentarily short circuited by a conductor having negligible resistance, the potential measurable between the terminals of such capacitor is quickly reduced to zero but, upon removal of the short circuit, a residual potential appears and is measurable between said terminals. Hereinafter, I may refer to this phenomenon as "polarization hysteresis" since it appears to be caused by polarization of molecules of the dielectric substance employed as spacing and insulating material between the conductive plates of these capacitors and the inability of the polarizable dielectric to become quickly depolarized. I have also observed that this phenomenon of polarization hysteresis is aggravated by changes in temperature of the timing capacitor. I have found that, when it is desired to measure accurately very short intervals of time, the absolute magnitude of the potential developed in a timing capacitor may be quite small, an appreciable portion of the charge may be held as bound charges in the dielectric, and these bound charges may appear as an appreciable additional part of the total potential in a second timing cycle if the bound charges are not completely neutralized between successive timing cycles.

It is, therefore, one object of my invention to minimize objectionable effects attributable to polarization hysteresis in capacitors which are charged to a potential which is employed as a measure of a period of time.

It is another object of my invention to provide a novel sequence of steps for charging and discharging electrical capacitors which are employed as elements in precise electric timing devices.

A further object of my invention is to provide an improved electrical system adapted to record or display a value which is a function of the length of a period of time.

Other and further objects of my invention will become apparent from the following description when read in conjunction with the accompanying drawing, in which Fig. 1 is an elementary circuit diagram symbolically illustrating the electrical connection of elements which may be used in the practice of my invention;

Fig. 2 is a diagram symbolically illustrating the electrical circuit of a system embodying novel features of my invention for automatically displaying or recording a value which is proportional to the difference in time between successive events; and Fig. 3 is a graph showing a plurality of curves illustrative of the nature and sequence of signals applied to elements of the system shown in Fig. 2.

In the several figures of the drawing like numerals or letters, where used, designate like parts.

Referring first to Fig. 1, the letter P designates a unidirectional source of substantially constant potential, such as a battery of electrolytic cells or the equivalent. $C_1$ and $C_2$ are conventional electrical capacitors which, taken together, form an electrostatic storage device. It will be understood that each of capacitors $C_1$ and $C_2$ are preferably made up of two or more electrically conductive plates spaced and insulated from each other by a dielectric substance such as mica, ceramic, paper or other suitable material. In order to obtain best results in the practice of my invention, capacitors $C_1$ and $C_2$ should be as nearly identical, physically and structurally, as possible. However, useful and satisfactory results will be obtained if capacitors $C_1$ and $C_2$ contain similar dielectric substances and have substantially equal capacitances or have values of capacitance within about 5% of each other.

Capacitor $C_1$ is connected in parallel relation to capacitor $C_2$ through switching means 2 and the conductors 3 and 4. Switching means 2 is preferably a conventional double-pole double-throw switch or relay constructed and arranged so that the polarity, or terminals, of capacitor $C_1$ may be quickly reversed with respect to the polarity, or terminals, of capacitor $C_2$. The parallel circuit, comprising capacitors $C_1$ and $C_2$ is connected in series with a resistance R and thence to opposite terminals of the source of potential P by conductors 5 and 6. Means, such as a switch or relay 7, is interposed in the series circuit comprising conductors 5 and 6, resistance R, and capacitors $C_1$ and $C_2$ to provide means for initiating and for terminating flow of current from source P into capacitors $C_1$ and $C_2$. As will be more fully explained in conjunction with Fig. 2, switch 7 and resistance R may be replaced by a suitable electron tube network which functions in a manner to provide a high resistance and a means for initiating and terminating flow of current.

It will be apparent that, at the instant switch 7 is closed to complete the series circuit, current begins to flow through resistance R and slowly builds up an electrostatic field between conductive plates in capacitor $C_1$ and between similar plates in capacitor $C_2$. This flow of current will continue until switch 7 is opened, or until the electrostatic potential between terminals of paralleled capacitors $C_1$ and $C_2$ is equal to the potential of source P. Obviously, the relative values of resistance R and the effective combined capacitance of $C_1$ and $C_2$ may be so chosen with respect to the potential of source P that any desired length of time can be required to charge the capacitors $C_1$ and $C_2$ to a preassigned fraction of the potential of source P. As shown in Fig. 1, I provide a high impedance meter 8, such as a vacuum tube voltmeter or a potentiometer, adapted to indicate or record the electrostatic potential developed in the parallel circuit comprising capacitors $C_1$ and $C_2$. Meter 8 may be connected across opposite terminals of capacitor $C_2$ by conductors 9 and 10. Since the potential of source P is constant, meter 8 may be calibrated in units of time provided the value of resistance R and the values of capacitances $C_1$ and $C_2$ are constant.

After a charge has been built up in capacitors $C_1$ and $C_2$, and after the potential developed between the terminals thereof has been measured, it is necessary to discharge the capacitors to zero potential before another charge, which will be proportional to the length of the charging time, is placed thereon. Accordingly, a switch, relay, or equivalent means 11 is preferably provided, and may be connected to the terminals of capacitor $C_2$ by conductors 12 and 13. When switch 11 is momentarily closed, a major portion of the charge in capacitors $C_1$ and $C_2$ is quickly discharged. Hereinafter, this portion of the charge may be referred to as "a readily dischargeable portion" of the charge. In accordance with my observations, if switch 11 is only momentarily closed, as it may be in a rapid timing cycle, charges which are firmly bound in capacitors $C_1$ and $C_2$, as by polarization of the dielectric therein, will not be completely discharged and the potential measurable across the terminals of capacitors $C_1$ and $C_2$ will immediately begin to rise upon opening switch 11. Therefore, in accordance with my invention, the polarity of capacitor $C_1$ is thereafter reversed with respect to the polarity of capacitor $C_2$ by means of switch 2. Any residual bound charge in capacitor $C_1$ thereby instantly neutralizes a residual bound charge of substantially equal magnitude in capacitor $C_2$ and the effective potential across the parallel circuit containing these capacitors is instantly reduced to zero or an exceedingly small value.

From the foregoing description it will become apparent that the advantages derivable from the method and apparatus of my invention may also be obtained when switching means 11 is omitted. Thus, after capacitors $C_1$ and $C_2$ have been charged to a desired extent and the potential therein has been measured or utilized in meter 8, switching means 2 may be operated to reverse the polarity of capacitor $C_1$ with respect to the polarity of capacitor $C_2$. Both the readily dischargeable and the difficulty dischargeable portions of the charge in these capacitors will then be neutralized instantaneously. In general, I prefer to close switch 11 before operating switch 2 in those instances where capacitances $C_1$ and $C_2$ are comparatively large, or where the actual potential between the opposite terminals of these capacitors is comparatively high.

Turning now to Fig. 2, I have shown schematically and symbolically one embodiment of an electrical system adapted to display an accurate record of values which are a function of, or proportional to, the times between the occurrence of successive events, and adapted to repeat the timing cycle rapidly and automatically. In the drawing the numerals 21 and 22 designate means for receiving spaced impulses and converting these impulses to electrical pulses. Since means 21 and 22 may be any of a large number of well-known means, details thereof are not shown. It will be understood, however, that means 21 and 22 may, for example, be devices adapted to receive acoustic impulses and to convert these impulses to sharp electrical pulses, or they may include photo-electric devices adapted to convert changes of intensity of light to electrical pulses. For purposes of illustration, it is assumed that pulse source 21 is always actuated before pulse source 22 so that source 21 may initiate the timing of an event and source 22 may terminate said timing. The impulse produced by source 21 is preferably in the form of a sharp negative pulse which is applied through conductor 23, capacitor 24, and conductors 25 and 26 to the grid or control electrode 27 of a thermionic space charge device or vacuum tube $T_2$. Similarly, the impulse produced by source 22 is also preferably in the form of a sharp negative pulse which is applied through conductor 28, capacitor 29 and conductor 30 to the grid or control electrode 31 of a thermionic space charge device or vacuum tube $T_1$. The anode 32 of tube $T_1$ is connected to the positive terminal of a source of direct current power P through a load resistance 33 and conductor 34, while the anode 35 of tube $T_2$ is similarly connected to power source P through load resistors $36a$, $36b$, and conductor 34. The cathode 37 of tube $T_2$ is connected to common ground G and the negative terminal of power source P through a resistance 38 by-passed by a capacitor 39. Cathode 40 of tube $T_1$ is connected to cathode 37 by conductors 41 and 42 through the normally closed contacts 43 of a spring-return relay whose solenoid is designated by the numeral 44.

The anode 32 of tube $T_1$ is coupled to control grid 27 of tube $T_2$ through resistor 45 having a capacitor 47 shunted in parallel therewith. Similarly, the anode 35 of tube $T_2$ is coupled to control grid 31 of tube $T_1$ through resistor 48 having a capacitor 50 shunted in parallel therewith. Control grids 27 and 31 are connected to common ground G through resistors 49 and 46, respectively. As will be evident to workers in the art, tubes $T_1$ and $T_2$ and the networks associated therewith form a conventional Eccles-Jordan type of trigger circuit.

Output from anode 35 of tube $T_2$ is taken from the junction between resistors $36a$ and $36b$ through conductor 51 and capacitor 52, and is applied to the control electrode or grid 53 of a thermionic space charge tube $T_3$ which is arranged as a conventional cathode follower. The anode 54 of tube $T_3$ may be connected to power source P through conductors 55 and 34. The cathode 56 thereof is connected to common ground G through resistors 57 and 58 in series. A suitable bias voltage is thereby provided for grid 53. A return path between grid 53 and cathode 56 is provided by a resistor 59 which connects grid 53 to the junction of resistors 57 and 58. Output energy may be taken from tube $T_3$ across cathode resistors 57 and 58 through a coupling condenser 60 connected to cathode 56.

When a negative pulse from pulse source 21 is applied to grid 27 of tube $T_2$, anode current in the latter is instantly cut off while flow of anode current in tube $T_1$ immediately begins and continues until a negative pulse, derived from pulse source 22, is applied to grid 31 of tube $T_2$. This latter pulse causes the anode current in tube $T_2$ to be cut off. As a result of this action, an excitation voltage is superimposed upon the negative bias voltage applied to grid 53 of tube $T_3$. This excitation voltage is in the form of a steeply rising and falling, substantially flat crested, square wave signal whose crest value is positive with respect to the bias voltage. The duration of the square wave crest is substantially equal to the difference in time between the pulse formed in pulse source 21 and that formed in pulse source 22.

The output energy derived from cathode 56 of tube $T_3$ is also in the form of an identical square wave signal and this output energy is applied through capacitor 60 to the control electrode or first grid 61 of a conventional pentode type thermionic space charge device or vacuum tube $T_4$ having a cathode 62, a second or screen grid 63, a third or suppressor grid 64, and an anode 65. Grid 64 and cathode 62 are joined together by a conductor 66 either internally or externally of tube $T_4$. Cathode 62 is connected to common ground G through a suitable resistance 67 while grid 64 is connected to the positive terminal of power source P through a suitable resistance 68. Control element 61 may be connected to common ground G through a resistance 69. The anode 65 of tube $T_4$ is connected through a conductor 70 to one terminal of a capacitor $C_2$ and through a conductor 71 to one terminal of a voltage utilization device, such as a conventional recording potentiometer or vacuum tube voltmeter represented in the drawing by the symbol M. The second terminal of capacitor $C_2$ is connected through a conductor 72 to the other terminal of device M and to the positive terminal of a source of substantially constant unidirectional potential. In Fig. 2 of the drawing this source of potential is shown as the anode 73 of a conventional cold cathode, gas-filled voltage regulating device or tube $T_9$ which may be connected to the positive terminal of power source P through a suitable voltage dropping or current limiting resistance 74. The cathode 75 of tube $T_9$ is joined to the negative terminal of source P through common ground G. It will be understood that any other suitable source of unidirectional constant potential, such as a battery of voltaic cells, may be substituted for the source shown provided the polarity of the source and constancy of the potential is maintained.

In accordance with my invention, a second capacitor $C_1$ having substantially the same capacitance as capacitor $C_2$ is connected in parallel with the latter through conductors 76 and 77. A double-pole, double-throw switching device, such as a fast acting, stepping relay, whose solenoid is designated by the numeral 78, is arranged in conductors 76 and 77 so that the terminals or polarity of capacitor $C_1$ may be quickly reversed with respect to the terminals or polarity of capacitor $C_2$, as indicated schematically in the drawing. It will be apparent to workers in the art that the aforementioned stepping relay is preferably of the type wherein a first energization of the solenoid causes the switch contacts thereof to move into a first position and remain there after de-energization of the solenoid and a second energization causes the switch contacts to move to a second position and remain there after de-energization. It will also be apparent to workers in the art that, under some conditions, the aforementioned stepping relay may be replaced by a double-pole, double-throw, spring return relay, but results obtained therewith generally will not be as satisfactory as with the stepping type of relay.

To provide a necessary operating potential within tube $T_4$, grid 63 thereof is connected through a conductor 79 to the positive terminal of a source of unidirectional potential such as is derivable through conductor 72 or conductor 34. When a positive excitation voltage, such as is derived from the square wave output of $T_3$, is superimposed upon the normal bias voltage applied to grid 61 of tube $T_4$, the latter tube behaves like a variable resistance adapted to pass current at a constant rate. Under these conditions an electrostatic potential is caused to build up at a substantially constant rate across the terminals of capacitor $C_2$ and capacitor $C_1$ in parallel therewith. When the amplitude of the excitation voltage applied to grid 61 suddenly drops back to the initial bias condition, the anode-cathode impedance of tube $T_4$ becomes almost infinite and capacitors $C_1$ and $C_2$ no longer build up additional potential. Meter device M thereafter will indicate the maximum potential developed in capacitors $C_1$ and $C_2$ and this potential will be proportional to the precise time of current flow through tube $T_4$ (and hence to the precise difference in timing between the pulses formed in pulse sources 21 and 22) provided the initial potential in capacitors $C_1$ and $C_2$ is zero.

So that the potential developed in capacitors $C_1$ and $C_2$ may be automatically reduced to zero at the end of a timing cycle, I provide an electronically controlled switching circuit which may be triggered by electrical pulses formed in source 21 or source 22. In Fig. 2 I have shown the actuation of the switching circuit as being initiated by a pulse derived from source 22. As may be seen from the drawing, a portion of the pulse energy from source 22 is applied through a conductor 80 and capacitor 81 to the anode 82 of a thermionic space charge device or vacuum tube $T_5$ and, thence, through a capacitor 83 to the control electrode or grid 84 of a similar tube $T_6$. The cathodes 85 and 86 of tubes $T_5$ and $T_6$, respectively, are joined together by a conductor 87 and are connected to common ground G through a suitable resistance 88. Control element or grid 89 of tube $T_5$ is provided with a suitable fixed bias potential by connection to an intermediate point on a voltage divider made up of resistance elements 90 and 91 which are connected in series between common ground G and a conductor 92 leading to the positive terminal of power source P. Control element 84 of tube $T_6$ is biased at a positive potential by connection to a resistance element 93 which may be connected to the positive terminal of power source P through conductor 92. Anode 82 of tube $T_5$ and anode 94 of tube $T_6$ are connected to conductor 92 and the positive terminal of power source P through anode load resistance elements 95 and 96, respectively.

Upon consideration of the circuit including tubes $T_5$ and $T_6$ it may be seen that anode current flows through tube $T_6$ and its cathode resistance element 88 when the circuit is in its normal equilibrium condition. The constants of the circuit may be so chosen that tube $T_5$ is cut off in this equilibrium condition because of the bias voltage which is developed across resistor 88 when plate current is flowing in tube $T_6$. As will be apparent to those familiar with flip-flop circuits of this type, tubes $T_5$ and $T_6$ should conduct successively but should not pass current at the same time. If plate resistors 95 and 96 were of the same magnitude, a substantially constant voltage would appear across cathode resistor 88 as a result of plate current through tube $T_6$ during one portion of the cycle and as a result of a like current through tube $T_5$ during the remainder of the cycle. In order that the signal obtained from cathode resistor 88 may assume a rectangular wave shape the plate resistors 95 and 96 are made unequal in size and I prefer to make resistor 95 considerably larger than resistor 96 so that a smaller voltage will appear across resistor 88 while tube $T_5$ is conducting than is the case when tube $T_6$ is conducting. To follow the sequence of operations in this circuit, consider first that tube $T_6$ is conducting and tube $T_5$ is nonconducting. When a short negative pulse derived from source 22 is applied to grid 84 through capacitors 81 and 83, the flow of anode current in tube $T_6$ is momentarily reduced to zero. As a result of this action, the potential across resistor 88 drops to zero which has the effect of removing the cut-off bias previously applied between grid 89 and cathode 85 of tube $T_5$ enabling said tube to pass plate current. As soon as tube $T_5$ begins to conduct, its plate voltage will be abruptly lowered and this reduction in voltage will be applied to grid 84 of tube $T_6$ through condenser 83. This will maintain tube $T_6$ in cut-off condition until condenser 83 has time to discharge through resistors 93 and 95, thereby allowing grid 84 to become increasingly positive in exponential fashion until tube $T_6$ again becomes conducting, thereby raising the voltage across resistor 88 and rendering tube $T_5$ nonconducting as was the case with the assumed original condition of the circuit. As a result of the above described action, the potential across resistor 88, when plotted against time, takes on substantially the form of a rectangular wave signal having a negative, or less positive, portion which endures for an interval governed by the time required for capacitor 83 to discharge through resistance elements 93 and 95. This rectangular wave signal is impressed across a differentiating network comprising a relatively small capacitance 97 and small resistance 98. The resulting differentiated signal thereafter is superimposed upon a negative bias voltage, supplied by suitable means such as a battery 99, applied to grid element 100 of a gas-filled, thermionic space charge device or thyratron $T_7$. The positive pulse of the differentiated signal triggers discharge of anode current between anode 101 and cathode 102 of tube $T_7$. Cathode 102 is connected to common ground G through a conductor 103 and relay solenoid 44. The flow of anode current in thyratron $T_7$ causes relay 44 to be actuated so long as sufficient current flows therethrough. However, anode 101 receives a positive potential from a relatively large capacitor 104, one of whose terminals is connected to common ground G and the other of whose terminals is connected to the positive terminal of power source P through a resistance element 105. The flow of anode current through tube $T_7$ rapidly discharges capacitor 104, whereupon continued flow of current ceases until capacitor 104 becomes recharged and another triggering pulse is applied to grid 100.

The spring-return type relay operated by solenoid 44 includes normally-closed contacts 43, normally-opened contacts 106, and double-throw contacts 107a and 107b, the former of which is normally closed by contact with a switch arm 107c. As has been mentioned hereinbefore, contacts 43 are connected through conductors 41 and 42 to the cathodes 40 and 37 in tubes $T_1$ and $T_2$. The normally-opened contacts 106 are connected through conductors 76 and 77 to opposite terminals of capacitor $C_1$ and thence through conductors 71 and 72 to opposite terminals of $C_2$. The contact 107a connects through a resistance element 108 to conductor 92 and the positive terminal of power source P, while contact 107b is connected to the grid element 109 of a thyratron $T_8$ and through a resistance element 110 to common ground G. The switch arm 107c, which may contact either 107a or 107b, is connected to one terminal of a capacitor 111 whose other terminal is grounded at G. Thus, when no current flows through solenoid 44, the cathodes 37 and 40 are connected together, capacitors $C_1$ and $C_2$ are not short circuited, and capacitor 111 is connected to receive a charge from source P through resistance element 108. On the other hand, when current is caused to flow through solenoid 44, contacts 43 are caused to open, thereby insuring that tube $T_2$ is made initially conductive for the next timing cycle, contacts 106 are caused to close, thereby momentarily short circuiting the terminals of capacitors $C_1$ and $C_2$, and switch arm 107c is moved from contact 107a to 107b, thereby applying the charge in capacitor 111 to grid element 109 in thyratron $T_8$, triggering a flow of anode current therein.

The cathode 112 of thyratron $T_8$ is connected by conductor 113 to the solenoid 78 and thence to common ground G. The anode 114 of thyratron $T_8$ is connected to one terminal of a capacitor 115, whose other terminal is grounded at G, and to a resistance element 116 which may connect through conductor 92 to the positive terminal of power source P.

When the flow of anode current through thyratron $T_8$ is triggered by application of the charge in capacitor 111 to grid 109, this anode current flows through solenoid 78 and causes operation of the stepping relay contacts whereby the terminals, or polarity, of capacitor $C_1$ are reversed with respect to the terminals, or polarity, of capacitor $C_2$, and any charges bound into the dielectric material of these capacitors are immediately neutralized. The flow of anode current in tube $T_8$ rapidly discharges capacitor 115, whereupon continued flow of current ceases until the capacitor becomes recharged and another triggering voltage from capacitor 111 is applied to grid 109.

The sequence of operations, above described, may be more easily understood by reference to Fig. 3 wherein I have shown a composite graph indicating the idealized nature and the sequence, but not in all cases the magnitude, of signals applied to the grid or control elements of the tubes $T_1$—$T_4$, and $T_6$—$T_8$ shown in Fig. 2. Upon the same graph I have also shown a curve representing the potential measurable across capacitors $C_1$ and $C_2$ as it might appear upon a record produced by recording voltmeter M.

In Fig. 3 the abscissae represent uniform units of time, which may be expressed in seconds or microseconds, whereas the ordinates represent arbitrary units of potential more positive or more negative than an equilibrium potential upon the element under consideration, except in the case of the bottom curve wherein the ordinates represent differences in arbitrary potential units between terminals of the capacitors $C_1$ and $C_2$.

The first, or upper, curve of Fig. 3 is designated by the numeral 201 and represents a series of sharp negative pulses applied by pulse source 21 to the grid element 27 of tube $T_2$. It may be seen that, for purposes of illustration, pulses are shown occurring after total elapsed time of 2, 8, 14 and 20 units. As mentioned hereinbefore, these pulses, acting through tubes $T_1$—$T_4$, initiate flow of current into capacitors $C_1$ and $C_2$.

The second curve is designated by the numeral 202 and represents a series of sharp negative pulses applied by pulse source 22 to the grid element 31 of tube $T_1$. The pulses are shown occurring after total elapsed time of 6, 9, 16, and 23 units. These pulses, acting through tubes $T_1$—$T_4$, cause termination of the flow of current into capacitors $C_1$ and $C_2$.

The third curve, designated by the numeral 203, represents the signal derived from the anode 35 of tube $T_2$ and applied to the grid elements 53 of tube $T_3$. It may be seen that when tube $T_2$ is made non-conductive, as a result of the application of a negative pulse to the grid element thereof, the signal applied to the grid 53 in tube $T_3$ swings positive and remains substantially steady until tube $T_2$ is again made conductive as by the application of a negative pulse to the grid element of tube $T_1$. Reference to Fig. 3 shows this effect wherein, at the instant the first pulse appears on curve 201, the signal applied to the grid of tube $T_3$ swings abruptly in a positive direction and then remains constant until the instant when the first pulse appears on curve 202, at which time the signal again swings abruptly in a negative direction. The substantially flat positive crest of the resulting square wave thus endures throughout the interval between the first pulse on curve 201 and the first pulse on curve 202.

Since the function of tube $T_3$ is to produce an output signal which is a faithful reproduction of its input signal, but at a different impedance, it is apparent that the signal applied to the grid element of $T_4$ is substantially identical to the signal applied to the grid of $T_3$. This is shown by the fourth curve designated by the numeral 204 in Fig. 3.

Also, since the signal applied to the grid element 84 of tube $T_6$ is identical to that applied to the grid element of tube $T_1$, the timing and nature of these signals should be identical. This is shown by the curve 205 in Fig. 3.

The sixth curve, designated by the numeral 206, represents the potential drop across resistance element 88 which is common to the cathodes of both tubes $T_5$ and $T_6$. By comparison of curve 206 with curve 205 it may be seen that, when a negative pulse is applied to the control grid of tube $T_6$, the potential across resistance element 88 abruptly swings in a more negative direction to a certain crest value and remains substantially at said value for a brief interval before swinging back abruptly to an equilibrium value. The duration of the crest is governed by the time constant of the resistances 93 and 95 and the capacitance 83.

The curve designated by the numeral 207 represents the signal applied to the grid of thyratron $T_7$. As may be seen from a comparison of curves 206 and 207, the signal applied to the grid of thyratron $T_7$ is in the form of a sharp negatively peaked signal followed by a sharp positively peaked signal, said peaks occurring substantially simultaneously with the fall and rise of potential across the resistance element 88 in the cathode circuit of tubes T₅ and T₆. As is evident to workers in the art, it is the positive peak of the signal applied to the grid of thyratron T₇ which triggers the flow of anode current therein. The delay in the generation of this positive peak as compared with the time of arrival of a pulse applied to the grid element of tube T₆ (curve 205) is governed by the time constant of capacitance 83 and resistance elements 93 and 95. This time constant is preferably made only sufficiently long to insure that meter M has time to record accurately the potential across capacitors C₁ and C₂.

The eighth curve, designated by the numeral 208, shows the signal applied to the grid element of thyratron T₈. It may be seen that this curve comprises a series of positive pulses which occur slightly later than the positive pulses shown in curve 207. As has been mentioned hereinbefore, the signal applied to the grid of tube T₈ is derived by the application of the charge in capacitor 111 to the grid 109 through relay contacts 107b and 107c. The delay between the positive peaks of curve 207 and curve 208 is due to unavoidable mechanical delay in actuation of contacts in relay 44. So that this delay may be as short as possible, relay 44 should be a selected fast-acting relay.

The ninth, or lower, curve in Fig. 3 is designated generally by the numeral 209 and represents the potential measurable across timing capacitors C₁ and C₂ in parallel. Upon comparison of curve 209 with curves 201—208, inclusive, it may be seen that at the instant of arrival of a pulse which is applied to the grid 27 of tube T₂ (curve 201), the potential across capacitors C₁ and C₂ begins to rise substantially linearly until the instant of arrival of a pulse which is applied to the grid 31 of tube T₁ (curve 202). The potential across capacitors C₁ and C₂ will then remain substantially constant until relay 44 has been actuated, thereby closing contacts 106 which short circuit the terminals of capacitors C₁ and C₂ simultaneously. The length of time during which contacts 106 remain closed is governed in part by the mechanical construction of relay 44 and, more importantly, by the time constant of capacitance 104 and resistance 105 in the anode circuit of thyratron T₇. For purposes of illustration, it has been assumed that this time constant is very small and the mechanical release of contacts 106 in relay 44 very fast so that the potential across capacitors C₁ and C₂ drops to zero substantially instantaneously as indicated by portions of curve 209 designated by the numeral 210.

Subsequent to the opening of contacts 106, I have found that the potential across capacitors C₁ and C₂ begins to rise at a rate proportional to the magnitude of the previous charge as represented by portions of curve 209 designated by the numeral 211. Even if the short circuit produced by closing contacts 106 is maintained for a considerable length of time, I have found that the potential produced by charges bound up in capacitors C₁ and C₂, as by polarization of the dielectric, are not completely neutralized and the error resulting from slow release of these charges may be an appreciable fraction of a small potential which it is desired to measure accurately. The broken line 212, shown adjacent curve 209 in Fig. 3, illustrates the nature of the error which may be introduced as a result of polarization hysteresis in a capacitor employed in precise timing circuits. If the magnitude of the potential developed across capacitors C₁ and C₂ as a result of charges bound into the dielectric was the same at the end of each timing measurement, it could be compensated for in subsequent calculations. However, this magnitude changes with different temperatures and with different intervals of time and cannot, therefore, be readily compensated. By reversing the polarity of capacitor C₁ with respect to the polarity of C₂, charges bound into the dielectric of each of these capacitors neutralize each other and the potential measured across these capacitors thereafter returns to zero as indicated by the portions 213 of curve 209.

Comparison of curves 208 and 209 will show that the portion 213 of curve 209 lags somewhat behind the pulse which triggers thyratron T₈ and thereby actuates relay 78. This delay represents mechanical delay in the actuation of contacts in relay 78. It will be apparent, therefore, that in a device intended to record the timing of events in rapidly repeated cycles, relay 78 must be selected to introduce negligible time delay between excitation of the solenoid therein and the resulting mechanical movement of the switching contacts.

From the foregoing description of Figs. 2 and 3, it may be seen that I have provided an electrical timing network having a constant potential source of unidirectional energy P, first and second capacitors C₁ and C₂ connected in parallel, switching means arranged to reverse polarity of the first capacitor with respect to the polarity of the second capacitor, a resistance value comprising the anode-cathode path of tube T₄ connected in series between the parallel circuit of capacitors C₁ and C₂ and the source P, and means comprising grid element 61 of tube T₄ for selectively initiating and terminating flow of current into capacitors C₁ and C₂. It may also be seen that, through the provision of pulse sources 21 and 22, the networks associated with tubes T₁—T₃, and the networks and relays associated with tubes T₅—T₈, I have provided means for controlling a sequence of steps which includes initiating flow of energy into capacitors C₁ and C₂, terminating said flow of energy, and subsequently reversing polarity of capacitor C₁ with respect to capacitor C₂.

It will be apparent to workers skilled in the art that many changes may be made in specific embodiments shown herein for illustrative purposes without departing from the spirit and scope of the appended claims.

Having described and illustrated my invention, what I claim as novel and desire to secure by Letters Patent is:

1. A method for neutralizing polarization hysteresis in an electrostatic energy storage device carrying an electrostatic charge upon a plurality of conductive plates having polarizable dielectric material therebetween which includes the steps of discharging a readily dischargeable portion of said charge and thereafter connecting the plates in substantially one-half of said device directly and in reversed polarity to the plates in another half thereof.

2. In a method for measuring a period of time wherein a unidirectional current is continuously flowed from a source of constant potential through a resistance in series therewith and is continuously stored during said period in an electrostatic energy storage device comprising a plurality of conductive plates and a plurality of polarizable dielectric members therebetween, and wherein the magnitude of the electrostatic potential developed in said storage device during said period is utilized as a measure of the duration of the period, the improvement which includes the sequence of steps of utilizing said electrostatic potential and, thereafter, connecting the plates in one-half of said storage device directly and in reversed polarity to the plates in another half thereof.

3. In a method for measuring a period of time wherein a unidirectional current is continuously flowed from a source of constant potential through a resistance in series therewith and is continuously stored during said period in an electrostatic energy storage device comprising a plurality of conductive plates and a plurality of polarizable dielectric members therebetween, and wherein the magnitude of the electrostatic potential developed in said storage device during said period is utilized as a measure of the duration of the period, the improvement which includes the sequence of steps of utilizing said electrostatic potential, thereafter discharging from said device a readily dischargeable portion of said potential, and then connecting the plates in substantially one-half of said storage device directly and in reversed polarity to the plates in another half thereof.

4. An electrical network comprising a substantially constant potential source of unidirectional electric energy, first and second electrical capacitors having substantially equal values of capacitance, means directly connecting said first capacitor in parallel to said second capacitor to form a parallel circuit, said means including switching means constructed and arranged to reverse selectively the polarity of connection of said first capacitor to said second capacitor, means electrically connecting said parallel circuit in series with said source of energy, means for selectively initiating and terminating a flow of energy from said source into said parallel circuit whereby an electrostatic field is formed in said capacitor, and means for discharging a readily dischargeable portion of said electrostatic field.

5. An electrical timing network comprising, in combination, a substantially constant potential source of unidirectional electric energy, first and second capacitors comprising polarizable dielectric material and having substantially equal values of capacitance, means directly connecting said first capacitor in parallel to said second capacitor to form a parallel circuit, said means including switching means constructed and arranged to reverse selectively the polarity of connection of said first capacitor to said second capacitor, means electrically connecting said parallel circuit in series with said source of energy, said last-mentioned means including a selected resistance value electrically connected in series with said source and said parallel circuit, means for selectively initiating and terminating a flow of energy from said source into said parallel circuit, means electrically connected in parallel with said capacitors for utilizing energy stored therein, and means for discharging a readily dischargeable portion of energy stored in said capacitors.

6. A network in accordance with claim 5 including, in combination, means for controlling the sequence of steps comprising initiating flow of energy, terminating said flow, discharging readily dischargeable energy, and subsequently reversing polarity of said first capacitor with respect to said second capacitor.

CHARLES J. CHARSKE.

References Cited in the file of this patent

UNITED STATES PATENTS

| Number | Name | Date |
|---|---|---|
| 2,384,829 | Garstang | Sept. 18, 1945 |
| 2,384,831 | Garstang | Sept. 18, 1945 |
| 2,534,043 | MacPhail | Dec. 12, 1950 |